Nov. 5, 1968 A. BRUEDER 3,409,098
VEHICLE CHASSIS
Filed March 15, 1966 6 Sheets-Sheet 5

INVENTOR.
ANTOINE BRUEDER

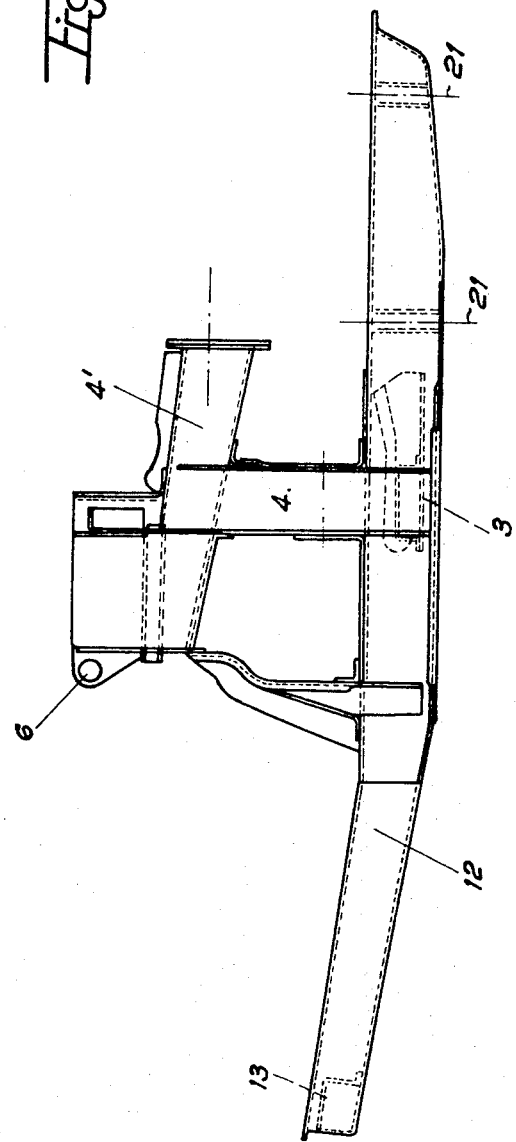

United States Patent Office 3,409,098
Patented Nov. 5, 1968

3,409,098
VEHICLE CHASSIS
Antoine Brueder, Paris, France, assignor to Societe Anonyme Andre Citroen, Paris, France, a French company
Filed Mar. 15, 1966, Ser. No. 534,536
Claims priority, application France, Mar. 18, 1965, 9,766
5 Claims. (Cl. 180—54)

ABSTRACT OF THE DISCLOSURE

A vehicle chassis having an engine-supporting front frame structure attached to a rear frame extending therefrom to the rear end of the vehicle, the engine-support frame having a pair of transversely spaced longitudinal members attached to the rear frame and spanned at the front end by a cross member, and a cradle between the ends of these members including a pair of spaced-apart uprights affixed to the longitudinal members and upper and lower cross members connecting the uprights which have holes preferably aligned with others in the longitudinal members through which a transmission shaft may pass.

---

This invention relates to a vehicle-chassis construction.

The components of the transmission, of the suspension and of steering mechanism for an automobile vehicle are often mounted on a chassis or framework which extends over the whole length of the vehicle. The mounting for these components is, for this reason, difficult in practice and necessitates, moreover, that the chassis or framework should conform to the lines on which these components are mounted.

There have already been constructed chassis which can be disassembled, these structures comprising cross members joined by means of pins or bolts and interconnecting two main longerons of the chassis but the engine and the transmission components are often secured both to a transverse member and to the longerons, so that once again the chassis must follow the mounting line of the components. Moreover, the securing of the transverse members by means of pins or bolts gives rise to the difficulty of allowing for flexing or torsion at the front of the chassis because of high local constraining forces.

The present invention has for its object improvements relating to vehicle chassis with a view to overcoming the defects of present-day chassis structures indicated above.

According to the invention a vehicle chassis itself terminates behind the driving transmission and is extended towards the front by a support-cradle structure comprising, on one hand, a member which is accurately machined and on which there are mounted the steering components and the suspension components and, on the other hand, two longerons which are fixed to this member and on which the engine and parts thereof are mounted. The two longerons may, if required, be connected to one another by transverse members constituting (with the longerons) a reinforcing frame.

In order to secure the cradle structure on the chassis whilst at the same time preventing any substantial flexing of the longerons or of the cradle, the latter is, preferably, provided towards its rear with support members disposed below the plane of the chassis and secured to corresponding members of the chassis.

These support members may be rigid with the longerons the end of each thereof being, for example, in the form of a fork. They may also be rigid with the support element.

Two embodiments of vehicle chassis in accordance with the invention will now be described, by way of example, with reference to the accompanying diagrammatic drawings, in which:

FIGURE 6 is a side-elevational view of the cradle structure of FIGURE 5.

Figure 1:
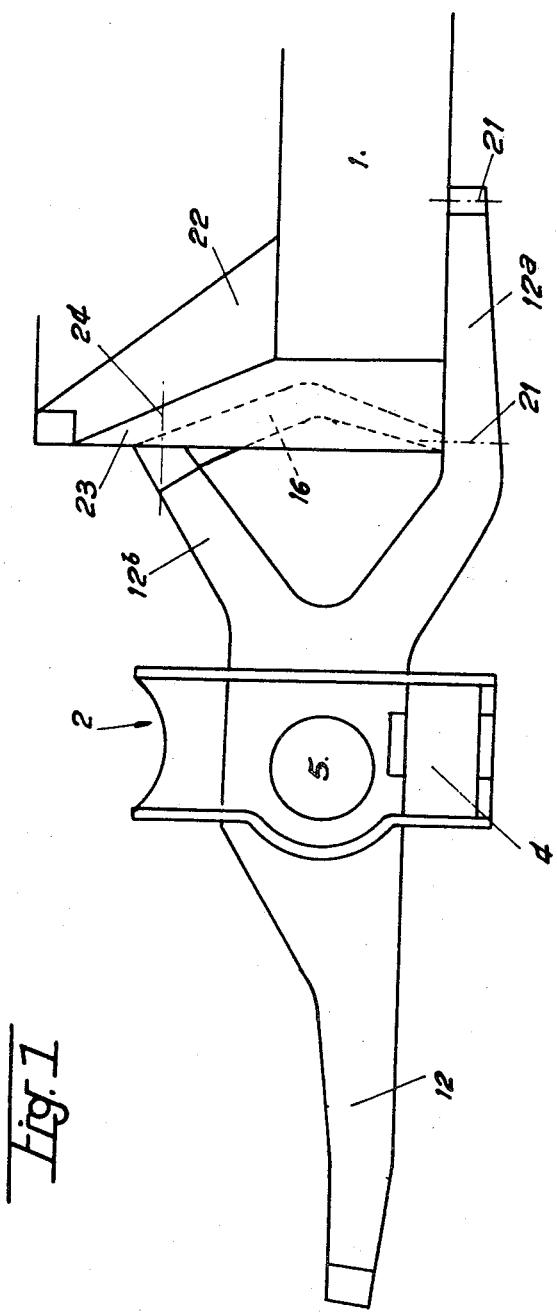
FIGURE 1 is a side-elevational view of a first embodiment of the assembled chassis.

As is shown in the drawing, the chassis itself, of which the longerons or longitudinal members can be seen, is shorter than a normal chassis and terminates behind the engine and associated parts (FIGURE 1). The chassis is extended to the front of the vehicle by a cradle structure which carries the engine and associated parts.

Figure 2:
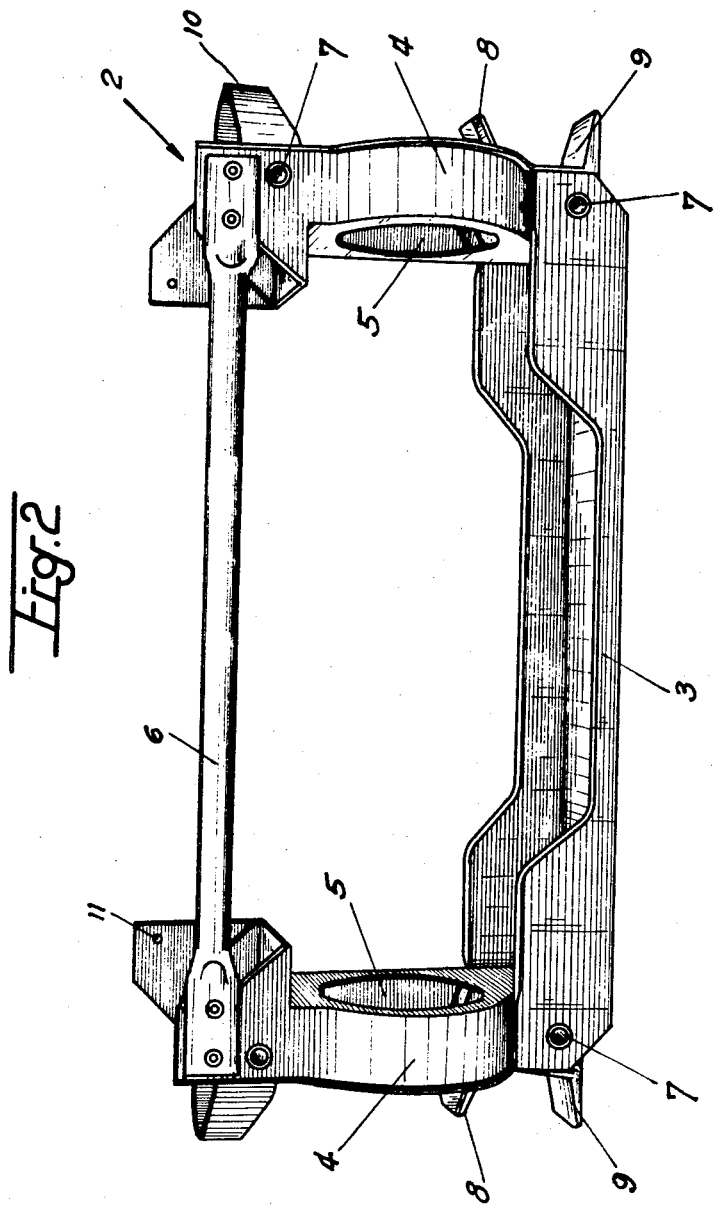
FIGURE 2 is a perspective view of a part of the cradle structure shown in FIGURE 1.
Figure 3:
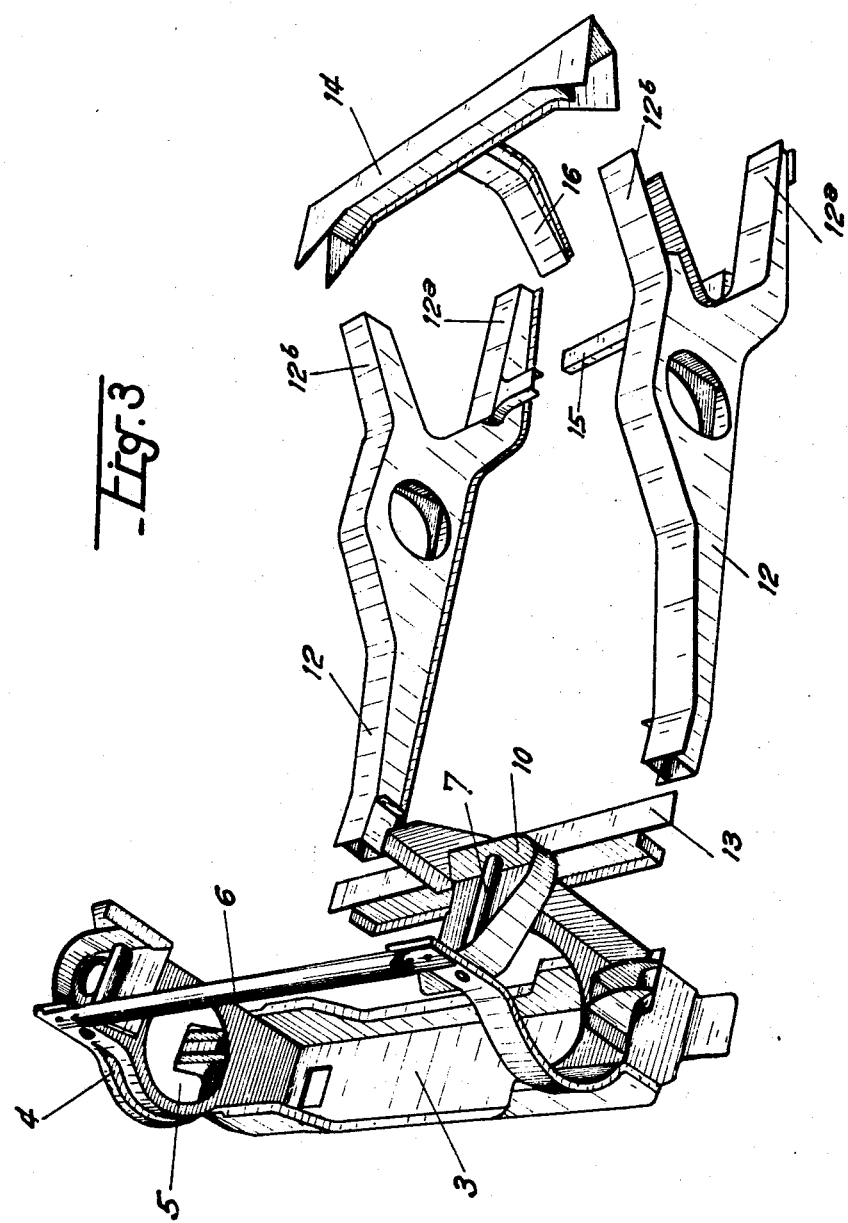
FIGURE 3 is a perspective view of the part of the cradle of FIGURE 2 and of its support frame, the members of the latter being shown in an exploded view.
Figure 4:
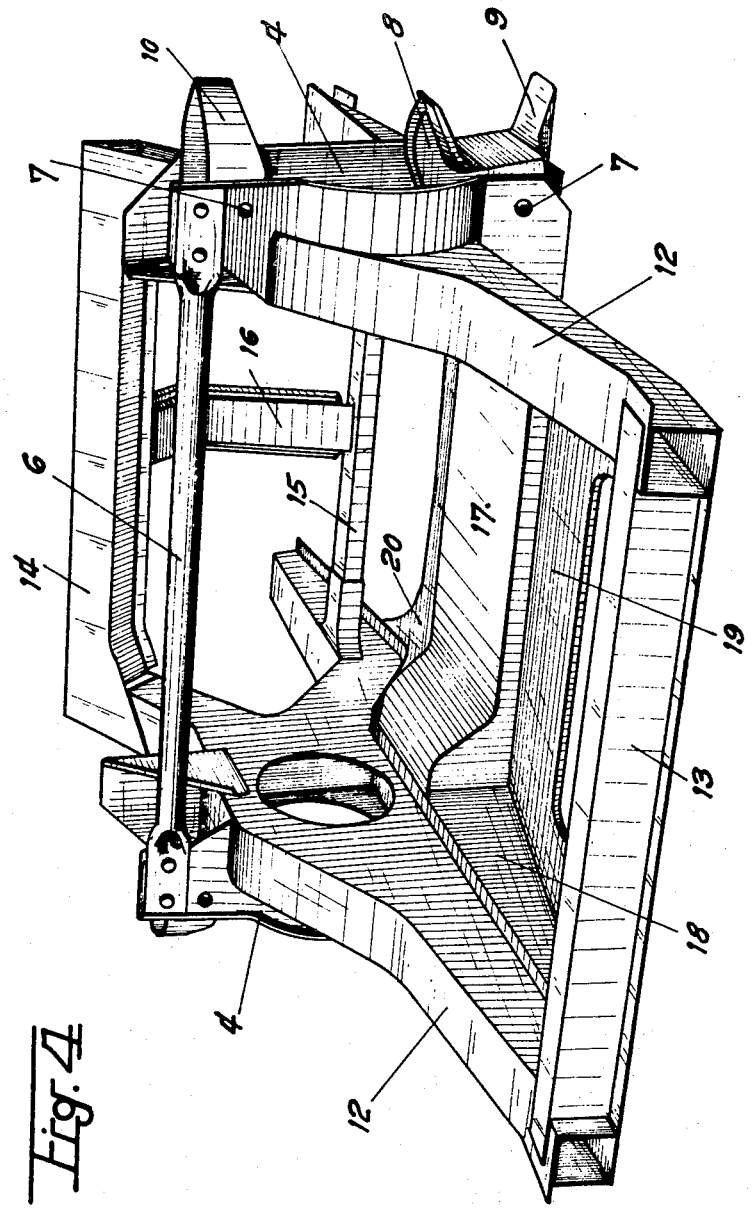
FIGURE 4 is a perspective view of the whole cradle structure of FIGURE 1 when assembled.

The cradle structure includes an element or sub-assembly of high strength which is designated generally in the drawing by the numeral 2 (FIGURE 2). This element has substantially the form of a rectangular framework extending vertically and comprising a lower transverse channel section member 3; at the extremities of this channel member there are secured vertical mounting members 4 each having an opening 5 for the passage of a transmission shaft. (The openings 5 are thus axially aligned.) The assembly can, if desired, be reinforced by an upper transverse member 6. This element 2 is precision machined in such a manner as to determine geometrically the locations of the steering members and of the suspension members. It is for this reason that the element 2 comprises guide apertures 7 for the pivots of the suspension arms, supports 8 and 9 for stops limiting the upward and downward movements of these arms, supports 10 for the suspension, and openings 11 for securing the steering gear members.

A frame constituted by two substantially horizontal longitudinal members 12 is secured to the element 2 and these members 12 have a high moment of inertia in a vertical plane and pass through the vertical members 4 between a transverse forward member 13 and two transverse rear members 14 and 15. The rear end of each of the members 12 is in the form of a fork, one of the arms 12a of this fork being horizontal and situated at a level slightly lower than the end of the front of the member 12 whilst the other arm 12b extends upwardly. The rear transverse members 14 and 15 are connected respectively to the arms 12b and the arms 12a. Member 16 connects the transverse members 14 and 15 and constitutes the rear support for the engine.

The cradle structure is completed by sheet metal members, such for example as sheet metal member 17 which covers the transverse member 3, vertical sheet metal members 18 and two lower sheet metal members 19 and 20. The parts 12 and 12b, 13 and 14 together form an inclined frame augmenting the rigidity of the cradle structure when mounted.

The members of the suspension, of the steering, of the transmission and of the wheels, are mounted on the cradle structure without the chassis itself being initially fixed thereto. The same applies to the engine assembly (engine, clutch and gear box), which rests on the member 16 as well as on the transverse member 13 and is secured to the latter.

There is thus provided a mechanical assembly of compact form which can be subsequently secured to the chassis. This securing may be effected by bolting the arm 12a to the lower part of the longerons 1 as indicated at 21 (FIGURE 1) and by securing the arm 12b to support parts 22 welded to the longerons. In this embodiment the connection between the arms 12b and the support parts 22 is effected through the intermediary of a ribbed sheet 23 on which the arms 12b are bolted and indicated at 24, and which is welded on the parts 22. The torsion couple which may arise between the cradle structure and the chassis is thus transformed into a reaction on the arms 12b on the parts 22.

Figure 5:
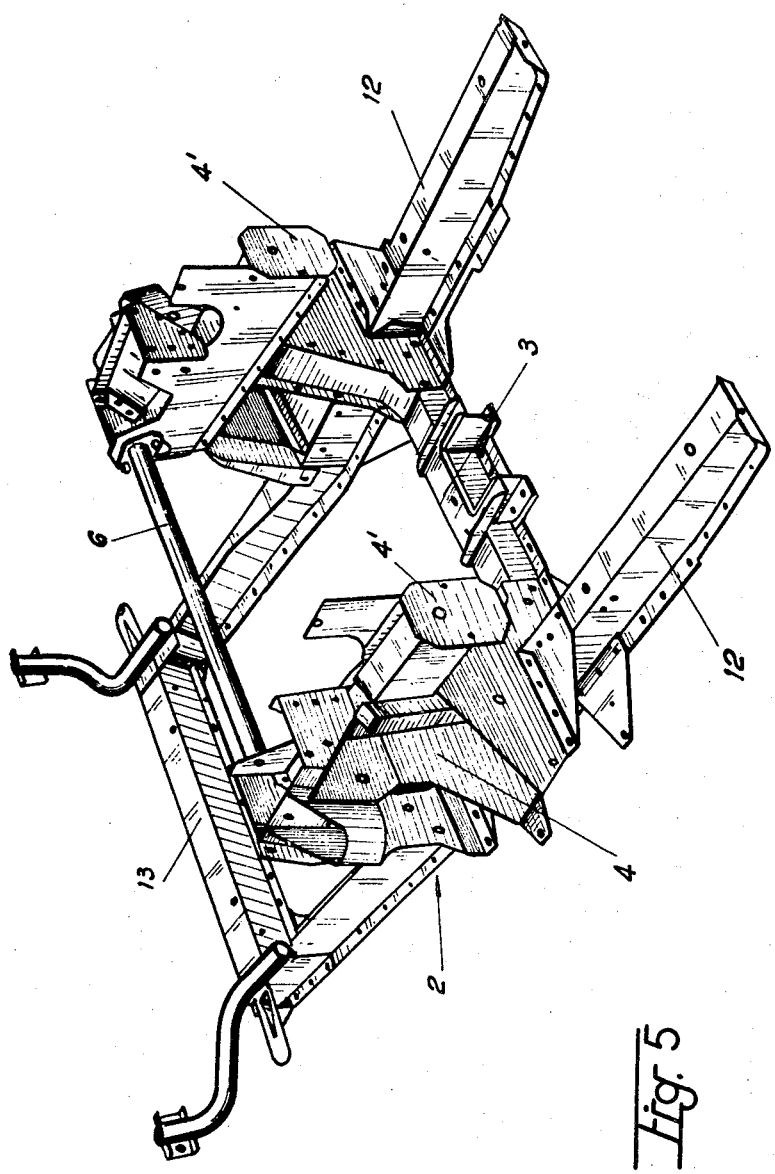
FIGURE 5 is a perspective view of another embodiment of the cradle structure.

In the embodiment of FIGURES 5 and 6, the rear end of each of the members 12 is not forked. The support members of the cradle structure are constituted by extensions 4' rigid with the upper part of the vertical members 4. Moreover, the transverse members 14 and 15 of the first embodiment have been omitted, which enables on the one hand the provision of a large bearing surface for the transverse member 3 on the longitudinal member 12 and on the other hand enables the longitudinal members 12 to be secured beneath the longerons 1 to a support base and point of connection of sufficient dimensions.

The omission of the transverse member 14 which closes the inclined frame 12, 12b, 13 is possible on the condition, of course, that the forward part of the chassis of the vehicle is constructed in such a manner as to provide the necessary strength; the members for securing the cradle structure onto this part of the vehicle must then be made in relation to the forces which they must transmit in the absence of the omitted transverse member.

In this modification, it will be seen that the longerons and the frame which they form in the horizontal plane once secured to the vehicle are assembled to the lower part of the vertical frame. This does not involve a structural difference in relation to the embodiment of FIGS. 1 to 4, in which they are assembled in the intermediate part of the uprights; the only change arises in the dimensioning of the assembly position which must be arranged in relation to a somewhat different distribution of forces.

I claim:
1. A chassis for a vehicle having an engine at the front thereof, a steering mechanism and a suspension system, comprising:
    a first framework extending substantially from the rear of the vehicle to a position to the rear of the engine; and
    a second framework extending substantially from the front of the vehicle to said position to the rear of the engine, said second framework including:
        a cradle comprising a pair of spaced opposed substantially vertical members each having an opening adapted to accommodate a transmission shaft, a lower transverse channel-section member interconnecting said vertical members, and an upper transverse member interconnecting said vertical members, and
        a pair of spacedly opposed longitudinal members secured to said cradle each having a bifurcated end adjacent said first framework and each having an opening aligned with the respective opening in the corresponding vertical member, said bifurcated ends being secured to the first framework, an upper transverse end member interconnecting one pair of limbs of said bifurcated ends, and a lower transverse end member interconnecting the other pair of limbs of said bifurcated ends.

2. A chassis construction for an automotive vehicle having an engine at the front thereof, a steering mechanism and a suspension system, said chassis construction comprising:
    a first framework extending from the rear of the vehicle to a position to the rear of the engine; and
    a second framework supporting said engine and said steering mechanism and extending substantially from the front of said vehicle to said position, said second framework including:
        a pair of transversely spaced opposed longitudinal members each secured at a rearward end thereof to said first framework,
        a pair of transversely spaced opposed upright members mounted upon said longitudinal members and affixed thereto, said upright members each being provided with an opening for the passage of a transmission shaft,
        a lower transverse member interconnecting said upright members,
        an upper transverse member affixed to and interconnecting said upright members and spaced above said lower transverse member, and
        a transverse end member rigidly connecting the forward ends of said longitudinal members.

3. The chassis construction defined in claim 2 wherein said rearward ends of said longitudinal members are detachably secured to said first framework.

4. The chassis construction defined in claim 2 wherein said rearward ends of said longitudinal members are each bifurcated with respective upper and lower arms extending toward said first framework, said structure further comprising a lower transverse member interconnecting the lower arms and an upper transverse member interconnecting the upper arms of said longitudinal members.

5. The chassis construction defined in claim 4 wherein said longitudinal members are provided with respective openings aligned with the respective openings of the corresponding upright members.

References Cited

UNITED STATES PATENTS

| 2,746,556 | 5/1956 | Nallinger et al. | 180—12 |
| 2,991,115 | 7/1961 | Wilfert | 280—106 XR |
| 3,165,161 | 1/1965 | Nallinger. | |

BENJAMIN HERSH, *Primary Examiner.*

L. D. MORRIS, JR., *Assistant Examiner.*